(12) United States Patent
Kim

(10) Patent No.: US 11,294,590 B2
(45) Date of Patent: Apr. 5, 2022

(54) STORAGE DEVICE WITH FAIL PAGE REPLACEMENT CAPABILITY AND OPERATING METHOD THEREOF

(71) Applicant: SK hynix Inc., Gyeonggi-do (KR)

(72) Inventor: Chi Eun Kim, Seoul (KR)

(73) Assignee: SK hynix Inc., Gyeonggi-do (KR)

( * ) Notice: Subject to any disclaimer, the term of this patent is extended or adjusted under 35 U.S.C. 154(b) by 163 days.

(21) Appl. No.: 16/276,375

(22) Filed: Feb. 14, 2019

(65) Prior Publication Data
US 2020/0026455 A1     Jan. 23, 2020

(30) Foreign Application Priority Data

Jul. 18, 2018 (KR) .................... 10-2018-0083667

(51) Int. Cl.
G06F 3/06     (2006.01)
(52) U.S. Cl.
CPC .......... *G06F 3/0652* (2013.01); *G06F 3/0604* (2013.01); *G06F 3/064* (2013.01); *G06F 3/0676* (2013.01); *G06F 3/0679* (2013.01)
(58) Field of Classification Search
CPC ...... G06F 3/0652; G06F 3/064; G06F 3/0676; G06F 3/0679; G06F 3/0604; G06F 3/0673; G06F 3/061
See application file for complete search history.

(56) References Cited

U.S. PATENT DOCUMENTS

| | | | | |
|---|---|---|---|---|
| 2006/0291304 | A1* | 12/2006 | Rothman | G11C 29/765 365/200 |
| 2013/0173954 | A1* | 7/2013 | Woo | G06F 11/167 714/6.13 |
| 2016/0259570 | A1* | 9/2016 | Agarwal | G06F 11/00 |
| 2018/0309547 | A1* | 10/2018 | Cheng | H04L 1/1845 |

FOREIGN PATENT DOCUMENTS

| | | |
|---|---|---|
| KR | 100572328 | 4/2006 |
| KR | 101797565 | 12/2017 |

* cited by examiner

*Primary Examiner* — Tasnima Matin
(74) *Attorney, Agent, or Firm* — IP & T Group LLP

(57) ABSTRACT

The present disclosure relates to an electronic device. A storage device having improved memory block use efficiency includes a plurality of memory blocks each including a plurality of pages storing data, an erase page storage configured to store erase page information about erase pages in a victim block among the plurality of memory blocks and a bad block controller configured to replace a fail page in which a program fail occurred with one of the erase pages, based on the erase page information, the fail page being one of the plurality of pages in one of the plurality of memory blocks other than the victim block.

17 Claims, 12 Drawing Sheets

FIG. 5
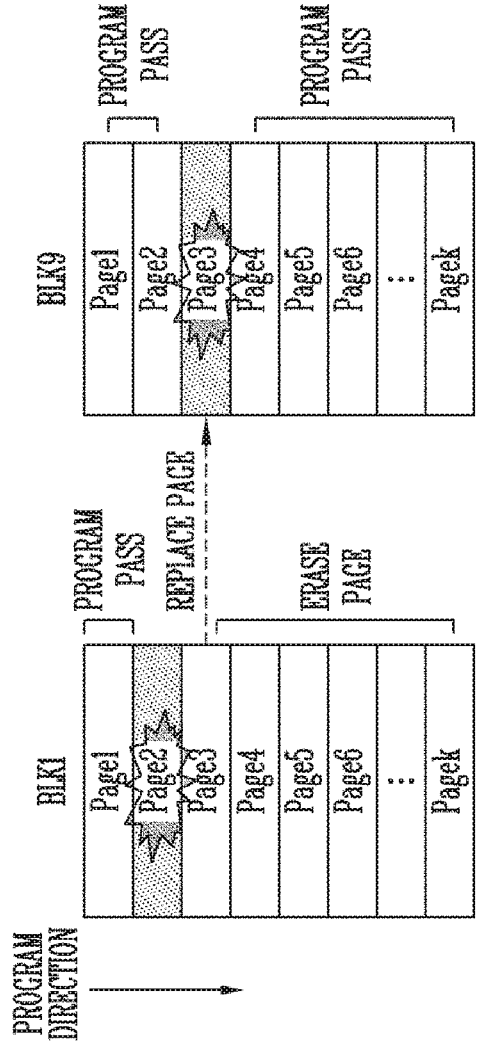
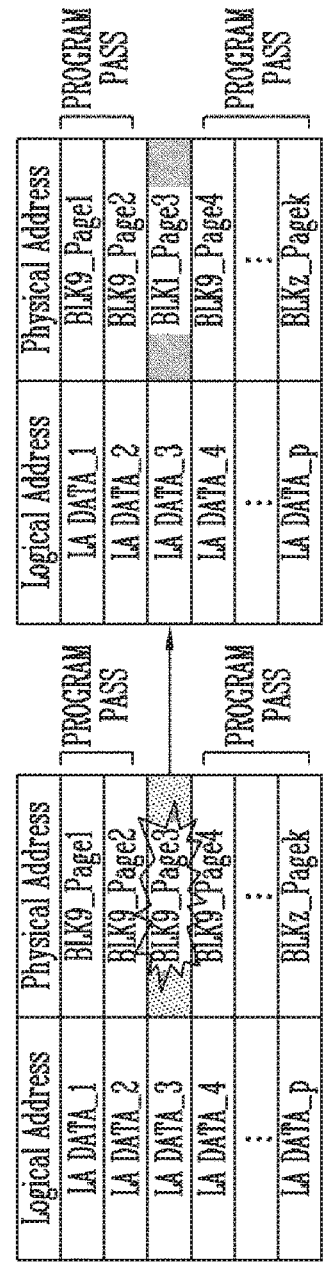

STORAGE DEVICE WITH FAIL PAGE REPLACEMENT CAPABILITY AND OPERATING METHOD THEREOF

CROSS-REFERENCE TO RELATED APPLICATION

The present application claims priority under 35 U.S.C. § 119(a) to Korean patent application number 10-2018-0083667, filed on Jul. 18, 2018, the entire disclosure of which is herein incorporated by reference in its entirety.

BACKGROUND

Field of Invention

Various embodiments of the present invention generally relate to an electronic device and. Particularly, the embodiments relate to a storage device and an operating method thereof.

Description of Related Art

A storage device may store data in response to control of a host device such as a computer, a smartphone, and a smartpad. Examples of the storage device include a device for storing data in a magnetic disk, such as a hard disk drive (HDD), and a device for storing data in a semiconductor memory, especially in a nonvolatile memory, such as a solid state drive (SSD) or a memory card.

A storage device may include a memory device storing data and a memory controller controlling the memory device. A memory device may be a volatile memory or a nonvolatile memory. Examples of nonvolatile memories include read only memory (ROM), programmable ROM (PROM), electrically programmable ROM (EPROM), electrically erasable and programmable ROM (EEPROM), flash memory, phase-change RAM (PRAM), magnetic RAM (MRAM), resistive RAM (RRAM), and ferroelectric RAM (FRAM).

SUMMARY

Various embodiments are directed to a storage device having memory block usage efficiency and a method of operating the storage device.

According to an embodiment, a storage device may include a plurality of memory blocks each including a plurality of pages storing data, an erase page storage configured to store erase page information about erase pages in a victim block among the plurality of memory blocks and a bad block controller configured to replace a fail page in which a program fail occurred with one of the erase pages, based on the erase page information, the fail page being one of the plurality of pages in one of the plurality of memory blocks other than the victim block.

According to an embodiment, a storage device may include a plurality of memory blocks each including a plurality of pages storing data, bad block controller configured to store a number of erase pages in each of bad blocks in which at least two program fails occur, among the plurality of memory blocks, and determine one of the bad blocks as a victim block on the basis of the number of erase pages in each of the bad blocks and an erase page storage configured to store erase page information about the erase pages in the victim block.

According to an embodiment, a storage device may include a memory device including a plurality of memory blocks, each including a plurality of pages and a controller configured to: control the memory device to perform a program operation, determine a block that becomes bad first (first bad block), among the plurality of memory blocks, as a victim block, store information regarding normal pages of the first bad block, the normal pages excluding program pass and fail pages, replace a program fail page of a block that becomes bad after the first bad block with one of the normal pages based on the stored information and generate mapping information between a logical address corresponding to the program fail page and a physical address of the one of the normal pages.

According to an embodiment, a method of operating a storage device may include performing a program operation on a plurality of pages included in a plurality of memory blocks, determining a bad block in which a program fail occurs, among the plurality of memory blocks, as a victim block, storing erase page information about erase pages in the victim block and replacing a fail page in which a program fail occurs, among pages in one of the plurality of memory blocks other than the victim block, with one of the erase pages, based on the erase page information.

BRIEF DESCRIPTION OF THE DRAWINGS

FIG. 5 is a diagram illustrating mapping information between a logical address and a physical address when a program fail occurs, in a memory device;

DETAILED DESCRIPTION

Figure 1:
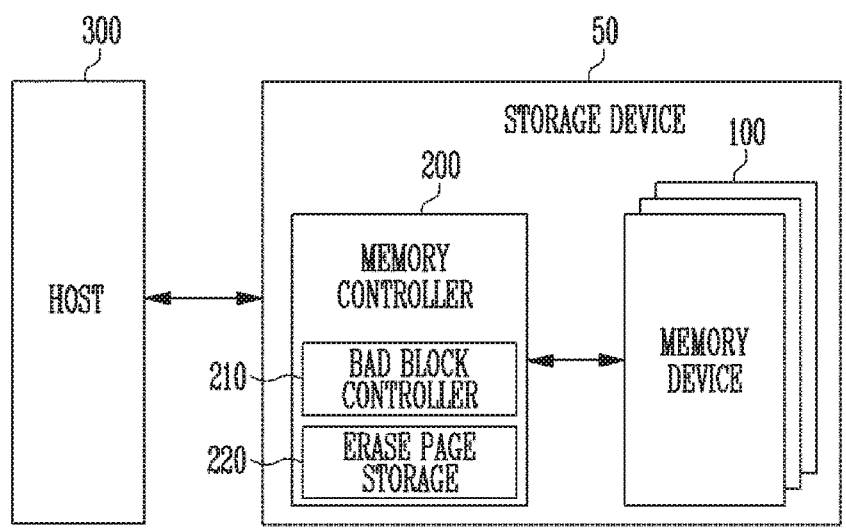
FIG. 1 is a block diagram illustrating a storage device according to an embodiment.

Specific structural and functional descriptions of embodiments of the present invention are disclosed. However, aspects of the present invention may be implemented in various other forms and carried out in various ways, as will be apparent to those skilled in the art in light of the present disclosure. Thus, the present invention is not limited to the embodiments disclosed herein.

While details are provided in connection with the disclosed embodiments, the present invention is not limited to specific details. Rather, the present invention includes all changes, equivalents, or substitutes that do not depart from the spirit and technical scope of the present disclosure.

While terms such as "first" and "second" may be used to identify various components, such components are not limited by such terms. The above terms are used to distinguish one component from the other component that otherwise have the same or similar name. For example, a first component may be referred to as a second component in a different instance and vice versa without departing from the scope of the present disclosure.

It will be understood that when an element is referred to as being "connected" or "coupled" to another element, it can be directly connected or coupled to the other element or one or more intervening elements may also be present. In contrast, when an element is referred to as being "directly connected" or "directly coupled" to another element, no intervening elements are present. Communication between two elements, whether directly or indirectly connected/coupled, may be wired or wireless, unless stated or the context indicates otherwise. Other expressions describing relationships between components such as "~between," "immediately~between" or "adjacent to~" and "directly adjacent to~" may be construed similarly.

The terms used in the present application are merely used to describe particular embodiments, and are not intended to limit the present disclosure. Singular forms in the present disclosure are intended to include the plural forms and vice versa, unless the context clearly indicates otherwise. In the present specification, it should be understood that terms "include" or "have" indicate that a feature, a number, a step, an operation, a component, a part or combination those thereof is present, but do not exclude the possibility that one or more other features, numbers, steps, operations, components, parts or combinations thereof may be present or added.

So far as not being differently defined, all terms used herein including technical or scientific terminologies have meanings that they are commonly understood by those skilled in the art to which the present disclosure pertains. The terms defined in generally used dictionaries should be construed as having the same meanings as would be construed in the context of the related art, and unless clearly defined otherwise in this specification, should not be construed as having idealistic or overly formal meanings.

In some embodiments, well-known processes, device structures, and technologies are not described in detail so as not to unnecessarily obscure aspects and features of the present invention. The intent in doing so is to make the present invention more clear.

Various embodiments of the present disclosure will be described in detail with reference to the accompanying drawings in order for those skilled in the art to be able to readily practice the present invention. Throughout the specification, reference to "an embodiment" or the like is not necessarily to only one embodiment, and different references to any such phrase are not necessarily to the same embodiment(s).

FIG. 1 is a block diagram illustrating a storage device 50 according to an embodiment.

Referring to FIG. 1, the storage device 50 may include a memory device 100 and a memory controller 200.

The storage device 50 may be configured to store data in response to a host 300. Examples of the storage device 50 include a cellular phone, a smartphone, an MP3 player, a laptop computer, a desktop computer, a game player, a television (TV), a tablet personal computer (PC), and an in-vehicle infotainment system.

The storage device 50 may be configured as any one of various types of storages depending on a host interface which is a communication method with the host 300. For example, the storage device 50 may be configured as any one of a solid state drive (SSD), a multimedia card (e.g., MMC, an eMMC, an RS-MMC and a micro-MMC), a secure digital card (e.g., an SD, a mini-SD and a micro-SD), a universal serial bus (USB) storage device, a universal flash storage (UFS) device, a Personal Computer Memory Card International Association (PCMCIA) card type storage device, a peripheral component interconnection (PCI) card type storage device, a PCI express (PCI-e or PCIe) card type storage device, a compact flash (CF) card, a smart media card, a memory stick, and the like.

The storage device 50 may be manufactured as any one of various types of packages. For example, the storage device 50 may be manufactured as a package-on-package (PoP), a system-in-package (SIP), a system-on-chip (SoC), a multi-chip package (MCP), a chip-on-board (COB), a wafer-level fabricated package (WFP), a wafer-level stack package (WSP) and the like.

The memory device 100 may store data. The memory device 100 may be operated under the control of the memory controller 200. The memory device 100 may include a memory cell array including a plurality of memory cells storing data. The memory cell array may include a plurality of memory blocks. Each of the memory blocks may include a plurality of memory cells. A single memory block may include a plurality of pages. According to an embodiment, a page may be a unit for storing data in the memory device 100 or reading data stored in the memory device 100. The memory block may be a unit for erasing data. According to an embodiment, the memory device 100 may be a double data rate synchronous dynamic random access memory (DDR SDRAM), a low power double data rate4 (LPDDR4) SDRAM, a graphics double data rate (GDDR) SDRAM, low power DDR (LPDDR), a Rambus dynamic random access memory (RDRAM), a NAND flash memory, a vertical NAND, a NOR flash memory, a resistive random access memory (RRAM), a phase-change memory (PRAM), a magnetoresistive random access memory (MRAM), a ferroelectric random access memory (FRAM), or a spin transfer torque random access memory (STT-RAM). By way of example, the memory device 100 is primarily described herein in the context of a NAND flash memory.

According to an embodiment, the memory device 100 may have a three-dimensional array structure. The present disclosure may also be applied not only to a flash memory in which a charge storage layer includes a conductive floating gate (FG), but also to a charge trap flash (CTF) memory in which a charge storage layer includes an insulating layer.

According to an embodiment, each of the memory cells included in the memory device 100 may be a single level cell (SLC) storing one bit of data. Alternatively, each of the memory cells of the memory device 100 may be configured as a multi-level cell (MLC) for storing two bits of data, a triple level cell (TLC) for storing three bits of data, or a quad level cell (QLC) for storing four bits of data.

The memory device 100 may receive a command and an address from the memory controller 200 and access an area selected in response to the address in the memory cell array. That is, the memory device 100 may perform an operation corresponding to the command on the area selected in response to the address. For example, the memory device 100 may perform a write operation (or program operation), a read operation, and an erase operation. During a program operation, the memory device 100 may program the area selected by the address with data. During a read operation, the memory device 100 may read data from the area selected by the address. During an erase operation, the memory device 100 may erase data from the area selected by the address.

The memory controller 200 may control the memory device 100 to perform a program, read, or erase operation with a set operating voltage.

The memory controller 200 may control general operations of the storage device 50.

When power is applied to the storage device 50, the memory controller 200 may execute firmware FW. When the memory device 100 is a flash memory device, the memory controller 200 may operate firmware such as a flash translation layer (FTL) for controlling communication between the host 300 and the memory device 100.

According to an embodiment, the memory controller 200 may receive data and a logical address LA from the host 300 and translate the logical address LA into a physical address PA indicating an address of each memory cell in the memory device 100 in which data is stored. In addition, the memory controller 200 may store mapping information indicating a mapping relationship between the logical address LA and the physical address PA.

The memory controller 200 may control the memory device 100 so that a program operation, a read operation or an erase operation may be performed in response to a request from the host 300. During a program operation, the memory controller 200 may provide a program command, the physical address PA, and data to the memory device 100. During a read operation, the memory controller 200 may provide a read command and the physical address PA to the memory device 100. During an erase operation, the memory controller 200 may provide an erase command and the physical address PA to the memory device 100.

According to an embodiment, the memory controller 200 may generate and transfer a program command, an address, and data to the memory device 100 without a request from the host 300. For example, the memory controller 200 may provide a command, an address, and data to the memory device 100 to perform background operations, such as a program operation for wear leveling and a program operation for garbage collection.

According to an embodiment, the memory controller 200 may include a bad block controller 210. The bad block controller 210 may control a memory block in which a program fail occurs when the memory device 100 performs a program operation. The bad block controller 210 may determine the memory block in which the program fail occurs as a victim block. The bad block controller 210 may store information about erase pages included in the victim block in an erase page storage 220. The information about the erase pages may relate to physical addresses of the pages including erased memory cells on which a program operation is not performed. The information about the erase pages may relate to physical addresses of the pages except for pages adjacent to a page in which a program fail occurs. The information about the erase pages may relate to physical addresses of the erase pages in a victim block after a garbage collection operation on the victim block is performed. The information about the physical addresses may be page numbers of the erase pages in the victim block. The information about the physical addresses may be physical addresses of the erase pages.

The bad block controller 210 may subsequently replace a fail page in which a program fail occurs with one of the erase pages stored in the erase page storage 220. A memory block including the fail page may be different from the victim block. The bad block controller 210 may control the memory device 100 so that data to be stored in the fail page may be stored in one of the erase pages.

According to an embodiment, the bad block controller 210 may store the number of erase pages in the memory block in which the program fail occurs. The bad block controller 210 may determine a victim block depending on the number of erase pages. For example, the bad block controller 210 may determine, as the victim block, a memory block including more erase pages among at least two memory blocks in each of which a program fail occurs.

According to an embodiment, the memory controller 200 may include the erase page storage 220. Information about erase pages in a bad block corresponding to a memory block in which a program fail occurs may be stored in the erase page storage 220. The information about the erase pages may include the physical address PA of each of the erase pages. The bad block controller 210 may control the memory device 100 so that data to be stored in the page in which the program fail occurs may be stored in one of the erase pages.

According to an embodiment, the memory device 100 may include at least two memory devices, each of which is controlled by the memory controller 200. The memory controller 200 may control the memory devices according to an interleaving scheme so as to improve operation performance.

The host 300 may communicate with the storage device 50 using at least one of various communication methods such as universal serial bus (USB), serial AT attachment (SATA), serial attached SCSI (SAS), high speed interchip (HSIC), small computer system interface (SCSI), peripheral component interconnection (PCI), PCI express (PCIe), non-volatile memory express (NVMe), universal flash storage (UFS), secure digital (SD), multimedia card (MMC), embedded MMC (eMMC), dual in-line memory module (DIMM), registered DIMM (RDIMM), and load reduced DIMM (LRDIMM) communication methods.

Figure 2:
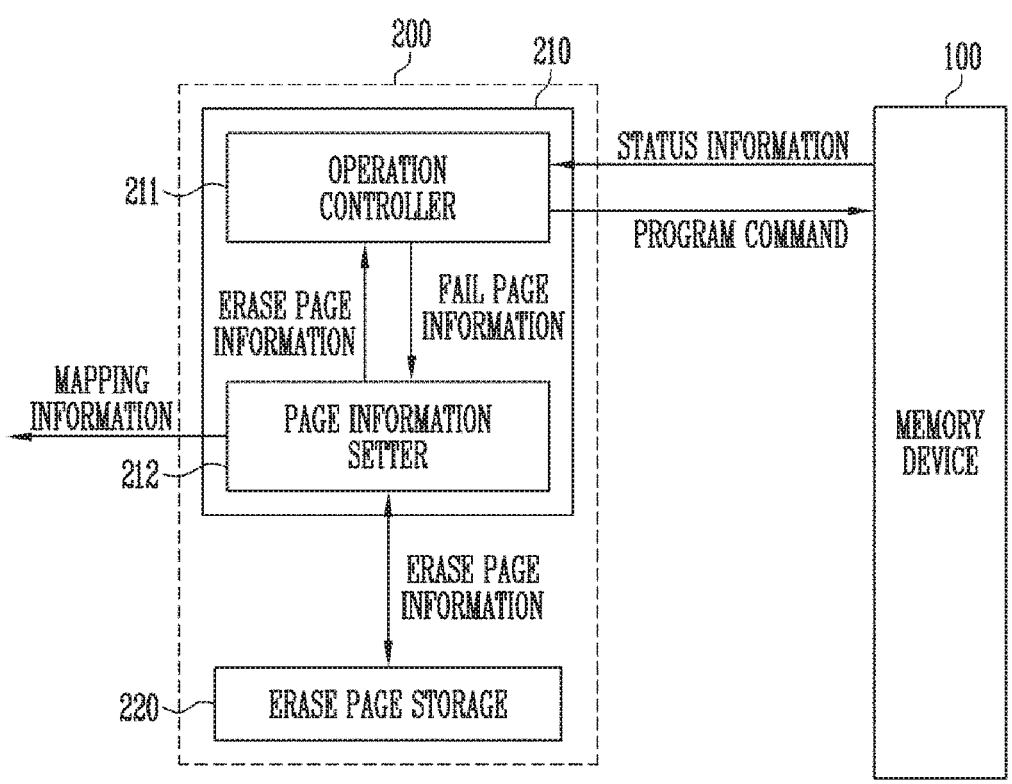
FIG. 2 is a diagram illustrating operations of a memory controller processing a program fail.

FIG. 2 is a diagram illustrating operations of a memory controller, e.g., the memory controller 200 of FIG. 1, processing a program fail.

Referring to FIG. 2, the memory controller 200 may include the bad block controller 210 and the erase page storage 220. The bad block controller 210 may include an operation controller 211 and a page information setter 212.

According to an embodiment, the memory controller 200 may provide a program command to the memory device 100 and request the memory device 100 for status information of the memory device 100. The memory device 100 may provide the status information thereof to the operation controller 211 at the request of the memory controller 200. The status information provided by the memory device 100 may include information as to whether a program operation performed by the memory device 100 passes or fails.

The operation controller 211 may determine whether or not a program fail occurs on the basis of the status information. When the program fail occurs, the operation controller 211 may provide fail page information to the page information setter 212. The fail page information may include information about the page in which the program fail occurs. According to an embodiment, the operation controller 211 may set a memory block including a page in which a program fail occurs for the first time as a victim block.

The operation controller 211 may set the victim block as a bad block. The memory controller 200 may not use memory blocks set as bad blocks. According to an embodiment, the operation controller 211 may store data in the victim block in another memory block.

The page information setter 212 may store erase page information in the erase page storage 220. The erase page information may relate to erase pages in the victim block. According to an embodiment, the erase page information may include information about a physical address of each of the erase pages.

The erase page storage 220 may include the erase page information. The erase page storage 220 may provide the page information setter 212 with the erase page information.

Subsequently, a program fail may occur in a page in a memory block other than the victim block. The operation controller 211 may detect the program fail on the basis of the status information provided by the memory device 100.

The operation controller 211 may acquire the erase page information from the page information setter 212. The operation controller 211 may control the memory device 100 so that data to be stored in the fail page in which the program fail occurs may be stored in one of the erase pages. The page information setter 212 may generate mapping information where a physical address of the fail page is changed into a physical address of one of the erase pages. The generated mapping information may be stored in a buffer memory in the memory controller 200 described above with reference to FIG. 1.

The operation controller 211 may provide the memory device 100 with a program command for storing data to be stored in the fail page in one of the erase pages.

Figure 3:
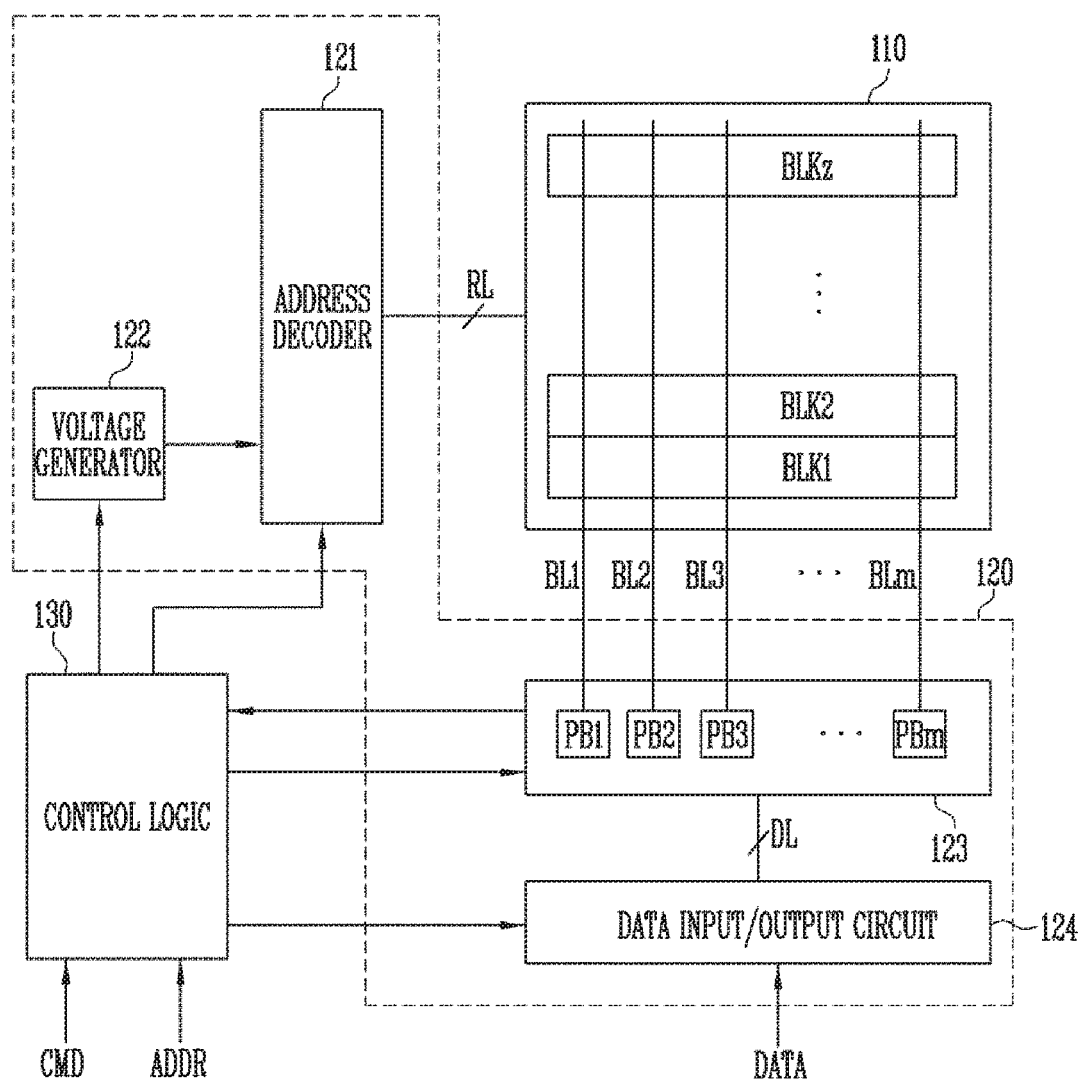
FIG. 3 is a block diagram illustrating a memory device of FIG. 1.

FIG. 3 is a block diagram illustrating a memory device, e.g., the memory device 100 of FIG. 1.

Referring to FIG. 3, the memory device 100 may include a memory cell array 110, a peripheral circuit 120, and a control logic 130.

The memory cell array 110 may include a plurality of memory blocks BLK1 to BLKz. The plurality of memory blocks BLK1 to BLKz may be coupled to an address decoder 121 through row lines RL. The plurality of memory blocks BLK1 to BLKz may be coupled to a read/write circuit 123 through bit lines BL1 to BLm. Each of the plurality of memory blocks BLK1 to BLKz may include a plurality of memory cells.

A memory block may be divided into a user block in which user data is stored and a system block in which system data is stored. The user block may be divided into a free block or a data block depending on whether or not data is stored therein. The free block may be an empty block where data is not stored. On the other hand, data may be stored in the data block. The data stored in the data block may be divided into valid data and invalid data.

A block which is unable to store data, among memory blocks, may be a bad block. Depending on time of occurrence, a bad block may be classified as a manufacture bad block (MBB) which occurs during the manufacturing processes of the memory device 100 and a growing bad block (GBB) which occurs during the use of the memory block. According to an embodiment, a memory block including a page in which a program fail occurs may be a growing bad block.

According to an embodiment, when a growing bad block occurs, the corresponding block may be set as a bad block, and erase pages in the corresponding block may be used by another memory block to replace pages in each of which a program fail occurs. Therefore, the storage device may control the memory device 100 so that the number of bad blocks caused by growing bad blocks may not exceed one (1).

Each of the memory blocks may include a plurality of memory cells storing data. According to an embodiment, the plurality of memory cells may be non-volatile memory cells. Memory cells coupled to the same word line, among the plurality of memory cells, may be defined as a single page. In other words, the memory cell array 110 may include a plurality of pages. In an embodiment, each of the plurality of memory blocks BLK1 to BLKz in the memory cell array 110 may include a plurality of dummy cells. One or more of the dummy cells may be coupled in series between a drain selection transistor and memory cells. In addition, one or more of the dummy cells may be coupled in series between a source selection transistor and memory cells.

Each of the memory cells in the memory device 100 may include a single-level cell (SLC) storing a single bit of data, a multi-level cell (MLC) storing two bits of data, a triple-level cell (TLC) storing three bits of data, or a quad-level cell (QLC) storing four bits of data.

The peripheral circuit 120 may include the address decoder 121, a voltage generator 122, the read/write circuit 123, and a data input/output circuit 124.

The peripheral circuit 120 may drive the memory cell array 110. For example, the peripheral circuit 120 may drive the memory cell array 110 to perform a program operation, a read operation, and an erase operation.

The address decoder 121 may be coupled to the memory cell array 110 through the row lines RL. The row lines RL may include drain select lines, word lines, source select lines, and a common source line. According to an embodiment, the word lines may include normal word lines and dummy word lines. According to an embodiment, the row lines RL may further include a pipe selection line.

The address decoder 121 may operate in response to control of the control logic 130. The address decoder 121 may receive an address ADDR from the control logic 130.

The address decoder 121 may decode a block address of the received address ADDR. The address decoder 121 may select at least one of the memory blocks BLK1 to BLKz according to the decoded block address. The address decoder 121 may decode a row address from the received address ADDR. The address decoder 121 may select at least one of the word lines coupled to a selected memory block by applying voltages provided by the voltage generator 122 to at least one word line WL among the word lines coupled to the selected memory block according to the decoded row address.

During a program operation, the address decoder 121 may apply a program voltage to the selected word line and apply a program pass voltage having a lower level than the program voltage to unselected word lines. During a program verify operation, the address decoder 121 may apply a verify voltage to the selected word line and a verify pass voltage greater than the verify voltage to the unselected word lines. During a read operation, the address decoder 121 may apply a read voltage to the selected word line and a read pass voltage greater than the read voltage to the unselected word lines.

According to an embodiment, an erase operation of the memory device 100 may be performed in units of memory blocks. During the erase operation, the address ADDR input to the memory device 100 may include a block address. The address decoder 121 may decode the block address and select at least one of the memory blocks BLK1 to BLKz according to the decoded block address. During the erase operation, the address decoder 121 may apply a ground voltage to word lines coupled to the selected memory block.

According to an embodiment, the address decoder 121 may decode a column address of the transferred address ADDR. A decoded column address DCA may be transferred to the read/write circuit 123. For example, the address decoder 121 may include components such as a row decoder, a column decoder and an address buffer.

The voltage generator 122 may generate a plurality of voltages by using an external power voltage supplied to the memory device 100. The voltage generator 122 may operate in response to the control of the control logic 130.

According to an embodiment, the voltage generator 122 may generate an internal power voltage by regulating the external power voltage. The internal power voltage generated by the voltage generator 122 may be used as an operating voltage of the memory device 100.

According to an embodiment, the voltage generator 122 may generate a plurality of voltages by using the external power voltage or the internal power voltage. The voltage generator 122 may generate various voltages required by the memory device 100. For example, the voltage generator 122 may generate a plurality of program voltages, a plurality of pass voltages, a plurality of select read voltages, and a plurality of unselect read voltages.

For example, the voltage generator 122 may include a plurality of pumping capacitors for receiving the internal power voltage and generate a plurality of voltages by selectively activating the plurality of pumping capacitors in response to the control of the control logic 130. The plurality of generated voltages may be supplied to the memory cell array 110 by the address decoder 121.

The read/write circuit 123 may include first to mth page buffers PB1 to PBm, where m is a positive integer. The first to mth page buffers PB1 to PBm may be coupled to the memory cell array 110 through first to mth bit lines BL1 to BLm, respectively. The first to mth page buffers PB1 to PBm may operate in response to control of the control logic 130.

The first to mth page buffers PB1 to PBm may communicate data with the data input/output circuit 124. During a program operation, the first to mth page buffers PB1 to PBm may receive data DATA to be stored through the data input/output circuit 124 and data lines DL.

During the program operation, a program pulse may be applied to a selected word line according to a row address. The first to mth page buffers PB1 to PBm may transfer the data DATA received through the data input/output circuit 124 to memory cells coupled to the selected word line through the bit lines BL1 to BLm, respectively. At least one of the memory cells coupled to the selected word line may be programmed according to the transferred data DATA. A threshold voltage of a memory cell coupled to a bit line to which a program permission voltage (for example, a ground voltage) is applied may be increased, whereas a threshold voltage of a memory cell coupled to a bit line to which a program inhibition voltage (e.g., a power supply voltage) is applied may be maintained.

During a program verify operation, the first to mth page buffers PB1 to PBm may read page data from the memory cells coupled to the selected word line through the bit lines BL1 to BLm, respectively.

During a read operation, the read/write circuit 123 may read the data DATA from the memory cells of the selected page through bit lines BL and output the read data DATA to the data input/output circuit 124.

During an erase operation, the read/write circuit 123 may float the bit lines BL. According to an embodiment, the read/write circuit 123 may include a column selection circuit.

The data input/output circuit 124 may be coupled to the first to mth page buffers PB1 to PBm through the data lines DL. The data input/output circuit 124 may operate in response to control of the control logic 130.

The data input/output circuit 124 may include a plurality of input/output buffers (not shown) that receive input data. During a program operation, the data input/output circuit 124 may receive the data DATA to be stored from an external device (e.g., the memory controller 200 of FIGS. 1 and 2). During a read operation, the data input/output circuit 124 may output the data transferred from the first to mth page buffers PB1 to PBm in the read/write circuit 123 to the external device.

The control logic 130 may be coupled to the address decoder 121, the voltage generator 122, the read/write circuit 123, and the data input/output circuit 124. The control logic 130 may control the general operations of the memory device 100. The control logic 130 may operate in response to the command CMD transferred from the external device.

Figure 4:
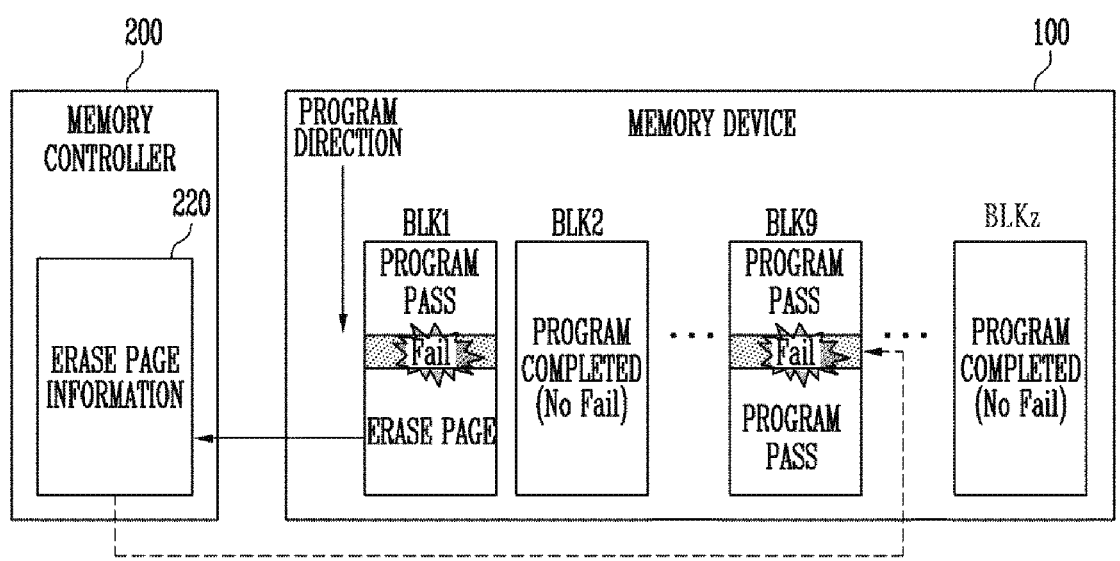
FIG. 4 is a diagram illustrating a method of replacing a page in which a program fail occurs by an erase page, in a memory device.

FIG. 4 is a diagram illustrating a method of replacing a page in which a program fail occurs by an erase page, in a memory device, e.g., the memory device 100 of FIG. 3.

Referring to FIG. 4, the memory device 100 may include a plurality of memory blocks BLK1 to BLKz, and a program fail occurs in each of the first and ninth memory blocks BLK1 and BLK9. In this example, a program operation is performed on first to zth memory blocks BLK1 to BLKz in a sequential manner.

Usually, during a program operation of the first memory block BLK1, when a program fail occurs in a particular page, the memory controller 200 may not use the first memory block BLK1 in which the program fail occurs by setting the first memory block BLK1 as a bad block. Subsequently, when a program fail occurs in the ninth memory block BLK9, the memory controller 200 may not use the ninth memory block BLK9 in which the program fail occurs by setting the ninth memory block BLK9 as a bad block. Therefore, since each memory block in which a program fail occurs is set as a bad block, data storage capacity may be reduced as the number of memory blocks set as bad blocks increases, which occurs as use of the memory device 100 increases.

According to an embodiment, when a program fail occurs in the first memory block BLK1, the memory controller 200 may store erase page information indicating erase pages in the memory block in which the program fail occurs. The information about the erase pages may relate to physical addresses the pages including erased memory cells on which a program operation is not performed.

When a program fail occurs in the ninth memory block BLK9, the memory controller 200 may control so that the memory device 100 may store data to be stored in the page of the ninth memory block BLK9 in which the program fail occurs in one of the erase pages of the first memory block BLK1. In other words, the memory controller 200 may replace the page of the ninth memory block BLK9 in which the program fail occurs with one of the erase pages of the first memory block BLK1 and may not set the ninth memory block BLK9 including the page in which the program fail occurs as a bad block.

As a result, the storage device 50 may use the erase pages of the first memory block BLK1 in which the program fail occurs for the first time so as to replace pages in each of which a program fail occurs subsequently. Therefore, the number of bad blocks in the memory device 100 may be reduced or increase more slowly.

FIG. 5 is a diagram illustrating mapping information between a logical address and a physical address when a program fail occurs, in a memory device, e.g., the memory device 100 of FIG. 4.

Referring to FIG. 5, a program fail occurs in each of the first and ninth memory blocks BLK1 and BLK9 in the memory device 100. In this example, a program operation in each memory block is performed on first to kth pages Page1 to Pagek in a sequential manner.

Here, a program operation on the first page Page1, among the pages in the first memory block BLK1, passes and a program fail occurs during a program operation on a second page Page2. The first memory block BLK1 in which the program fail occurs may be set as a victim block. The other pages except for the first page Page1 on which the program operation is already performed and the second page Page2 in which the program fail occurs, among the first to kth pages in the first memory block BLK1, may be erase pages on which a program operation is not yet performed. Therefore, third to kth pages Page3 to Pagek which are erase pages may replace fail pages which may occur after the second page Page2.

For example, after the program fail occurs in the first memory block BLK1, a program operation may be performed on the next memory block. In the embodiment of FIG. 5, a program fail occurs in the ninth memory block BLK9 during a program operation of the memory device 100. More specifically, a program operation on each of the first page Page1 and the second page Page2, among the pages in the ninth memory block BLK9, may pass, and a program fail may occur during a program operation on the third page Page3. According to an embodiment, the third page Page3 of the ninth memory block BLK9 may be replaced by the third page Page3 which is one of the erase pages in the first memory block BLK1. In other words, data to be stored in the third page Page3 of the ninth memory block BLK9 may be stored in the third page Page3 of the first memory block BLK1. Subsequently, a program operation may be performed on fourth to kth pages Page4 to Pagek of the ninth memory block BLK9.

When the third page Page3 of the ninth memory block BLK9 is replaced by the third page Page3 of the first memory block BLK1, mapping information between the logical address and the physical address may be changed.

According to an embodiment, the logical address may include first to pth logical address data LA DATA_1 to LA DATA_p. The logical address may be provided by the host 300 of FIG. 1 and the physical address may indicate a physical location at which data is stored in the memory device 100. The first to pth logical address data LA DATA_1 to LA DATA_p may establish a mapping relationship with one of the physical addresses. For example, the first logical address data LA DATA_1 may correspond to a first page BLK9_Page1 of the ninth memory block BLK9. The second logical address data LA DATA_2 may correspond to a second page BLK9_Page2 of the ninth memory block BLK9. The third logical address data LA DATA_3 may correspond to a third page BLK9_Page3 of the ninth memory block BLK9. The fourth logical address data LA DATA_4 may correspond to a fourth page BLK9_Page4 of the ninth memory block BLK9. The pth logical address data LA DATA_p may correspond to a kth page Pagek of the zth memory block BLKz.

When a program fail occurs in the third page Page3 of the ninth memory block BLK9 and the third page Page3 of the ninth memory block BLK9 is replaced by the third page Page3 of the first memory block BLK1, the physical address corresponding to the third logical address data LA DATA_3 may change from the third page BLK9_Page3 of the ninth memory block BLK9 to a third page BLK1_Page3 of the first memory block BLK1.

Figure 6:
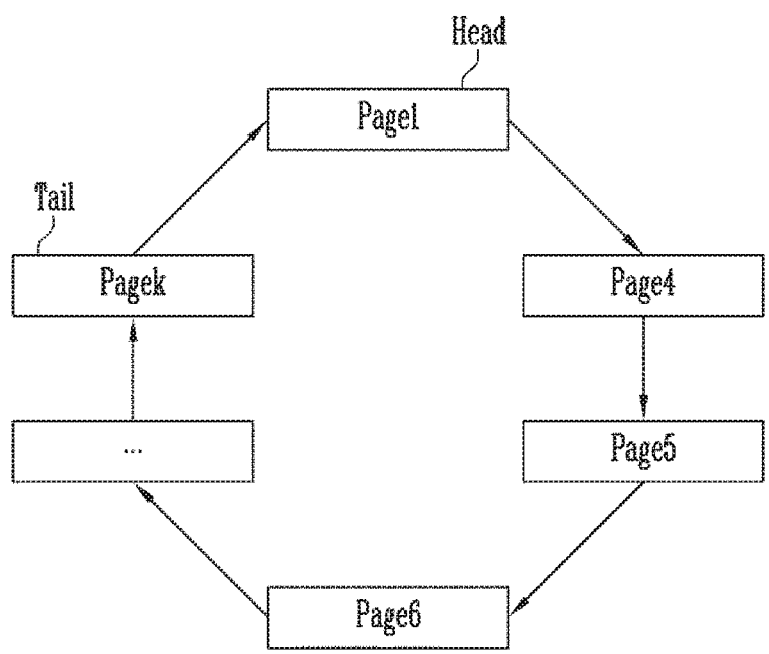
FIG. 6 is a diagram illustrating erase page information stored in an erase page storage according to an embodiment.

FIG. 6 is a diagram illustrating erase page information stored in an erase page storage, e.g., the erase page storage 220 of FIG. 2, according to an embodiment.

Referring to FIG. 6, the erase page storage 220 may be implemented in the form of a circular queue in which the erase page information may be stored. The erase page information may include information about physical addresses of erase pages in a victim block. The circular queue may include a head indicating a start point of data and a tail indicating an end of the data.

The remaining pages except for the second page Paget and the third page Page3, among the pages in the victim block, may be erase pages. In other words, the erase pages may correspond to one of the first page Page1 and the fourth page Page4 to the kth page Pagek. The erase page information may include information about physical addresses of the first page Page1 and the fourth page Page4 to the kth page Pagek.

When the first page Page1 indicated by the head replaces another fail page, the position of the head may be changed into the fourth page Page4 corresponding to the next data. The position of the head may be moved to the next data as erase pages replace fail pages. When the position of the head is the same as the position of the tail, data may no longer be stored in the circular queue.

Although FIG. 6 shows an embodiment in which the erase page information is stored in a circular queue, the erase page information may be stored in other ways using various other methods.

Figure 7:
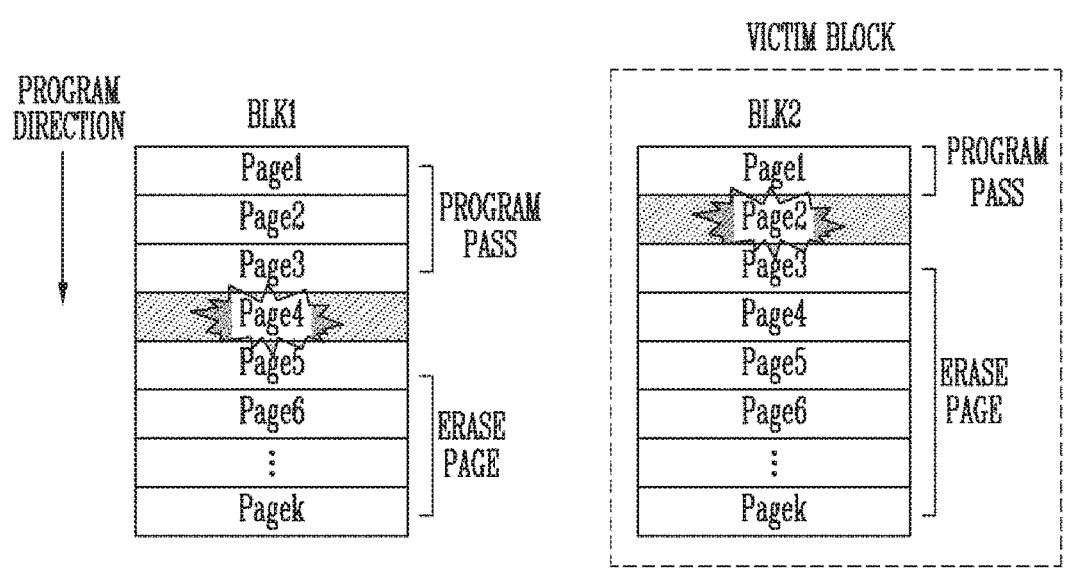
FIG. 7 is a diagram illustrating a method of determining a victim block according to the number of erase pages.

FIG. 7 is a diagram illustrating a method of determining a victim block according to the number of erase pages in a memory device.

Referring to FIG. 7, a program fail occurs in each of the first and second memory blocks BLK1 and BLK2 in the memory device.

When a program operation is performed on the first memory block BLK1, a program pass may occur in the first to third pages Page1 to Page3 and a program fail may occur in the fourth page Page4. Therefore, an erase page may correspond to one of the fifth to kth pages Page5 to Pagek. The number of erase pages in the first memory block BLK1 may be (k-4) and be stored in the bad block controller 210 shown in FIG. 1.

When a program operation is performed on the second memory block BLK2, a program pass may occur in the first page Page1 and a program fail may occur in the second page Paget. Therefore, an erase page may correspond to one of the third to kth pages Page3 to Pagek. The number of erase pages in the second memory block BLK2 may be (k-2) and be stored in the bad block controller 210.

The bad block controller 210 may set a memory block having more erase pages among memory blocks in each of which a program fail occurs, as a victim block. As the number of erase pages increases, more fail pages may be replaced by erase pages. Therefore, the bad block controller 210 may set a memory block having more erase pages as a victim block.

According to an embodiment, since the number of erase pages in the second memory block BLK2 is greater than the number of erase pages in the first memory block BLK1, the bad block controller 210 may set the second memory block BLK2 as a victim block. When the second memory block BLK2 is set as the victim block, the erase page information of the second memory block BLK2 may be stored in the erase page storage 220.

Figure 8:
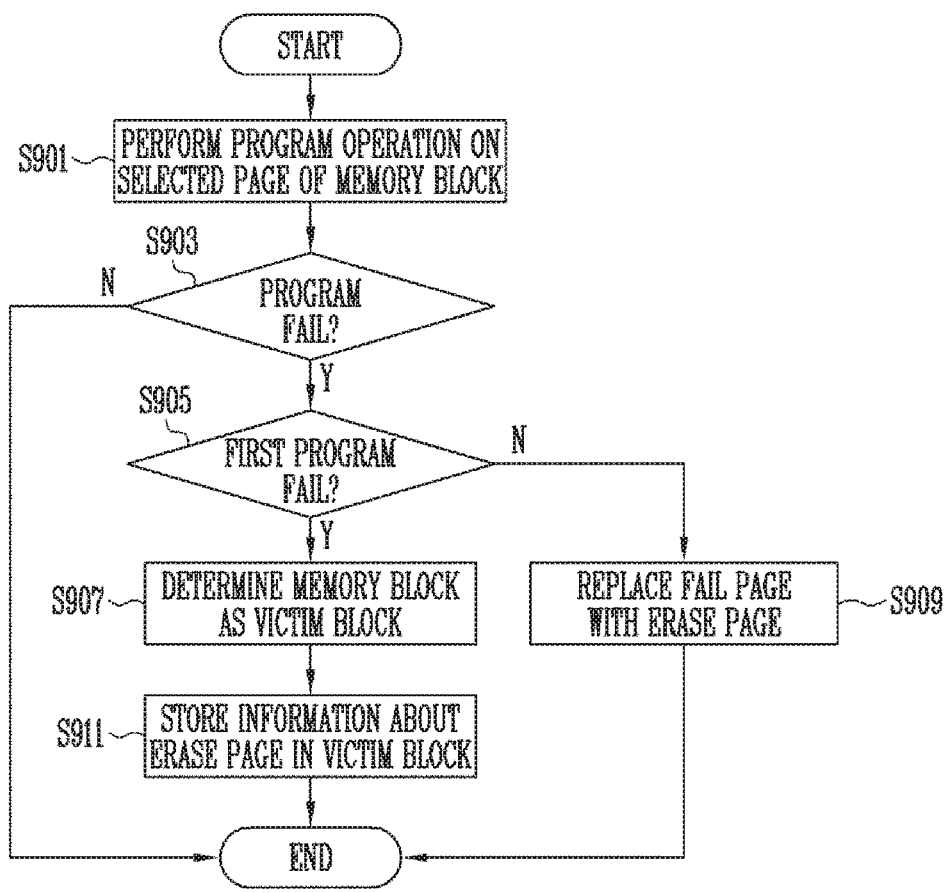
FIG. 8 is a flowchart illustrating operations of a memory device and a memory controller according to an embodiment.

FIG. 8 is a flowchart for illustrating operations of a memory device and memory controller, e.g., the memory device 100 and the memory controller 200 of FIGS. 1 to 4, according to an embodiment.

Referring to FIG. 8, at step S901, the memory device 100 may perform a program operation on a selected page of a memory block. The memory device 100 may perform a program operation so that memory cells coupled to the selected page may reach a target threshold voltage.

At step S903, the operation controller 211 of FIG. 2 may determine whether a program fail occurs in the memory block during the program operation on the basis of status information provided from the memory device 100. When it is determined that a program fail occurred (that is, "Y" at step S903), the process flow may proceed to step S905.

At step S905, the operation controller 211 may determine whether the program fail was the first to occur during the program operation. When it is determined that the program fail occurred for the first time (that is, "Y" at step S905), the process flow may proceed to step S907. Otherwise (that is, "N" at step S905), the process flow may proceed to S909.

At step S907, the bad block controller 210 may determine the memory block in which the program fail occurred as a victim block. The memory block in which the program fail occurred may be set as a bad block.

At step S909, the page in which the program fail occurred may be replaced by one of the erase pages. In that case, data to be stored in the page in which the program fail occurred may be stored in the erase page.

At step S911, when the victim block is determined at step S907, the erase page storage 220 may store erase page information about erase pages in the victim block. The erase page information may relate to physical addresses of the pages including erased memory cells on which a program operation is not performed.

Figure 9:
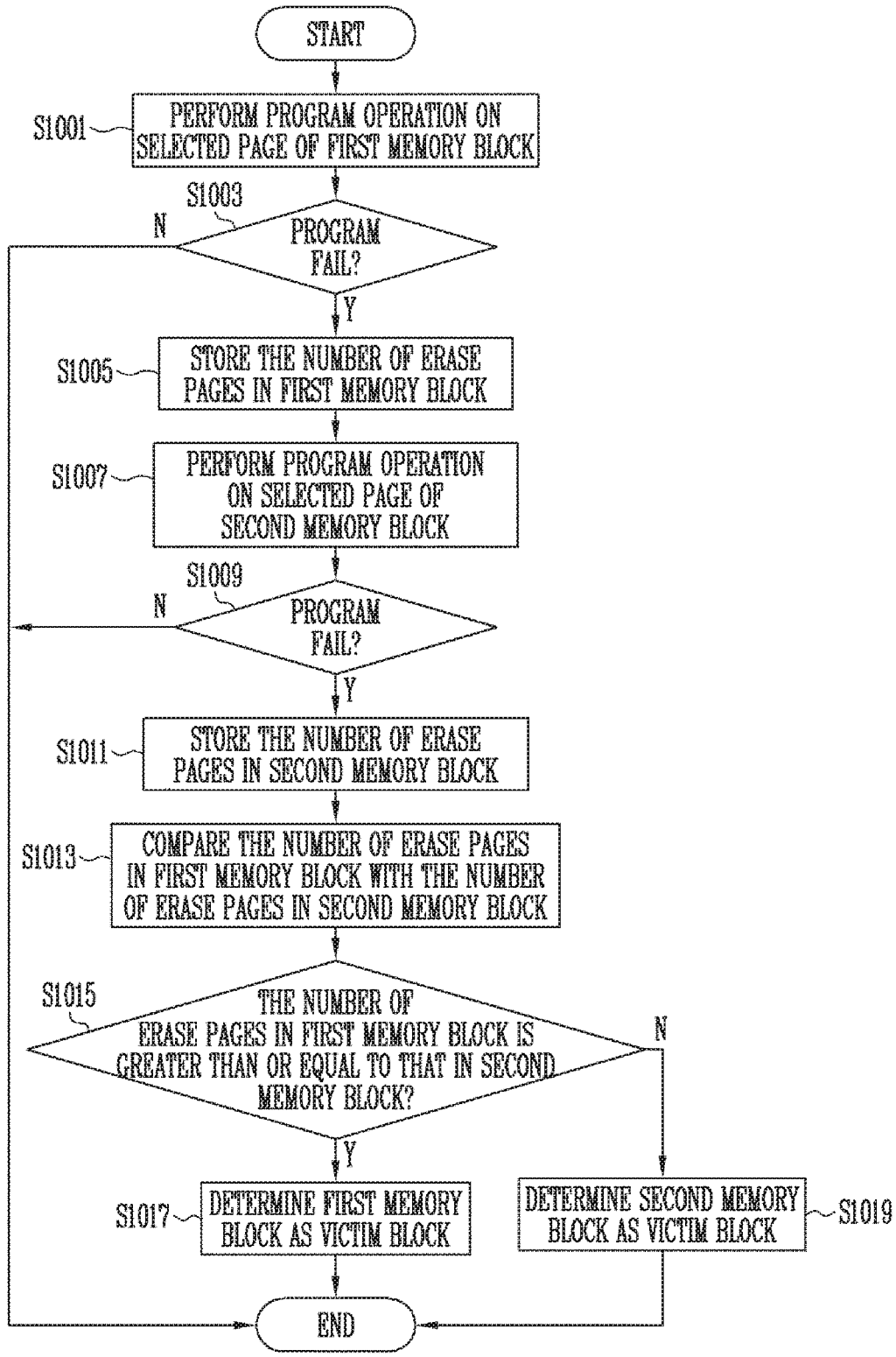
FIG. 9 is a flowchart illustrating operations of a memory device and a memory controller according to an embodiment.

FIG. 9 is a flowchart for illustrating operations of a memory device and memory controller, e.g., the memory device 100 and the memory controller 200 of FIGS. 1 and 2, according to an embodiment.

Referring to FIG. 9, at step S1001, the memory device 100 may perform a program operation on a selected page of a first memory block. The first memory block may correspond to one of the plurality of memory blocks of the memory device 100. The memory device 100 may perform a program operation so that each of the memory cells coupled to the selected page of the first memory block may reach a target threshold voltage.

At step S1003, when the memory device 100 performs the program operation on the first memory block, the bad block controller 210 of FIG. 2 may determine whether a program fail occurs in the first memory block. When it is determined that a program fail occurred (that is, "Y" at step S1003), the process flow may proceed to step S1005.

At step S1005, the number of erase pages in the first memory block may be stored in the bad block controller 210. An erase page may include erased memory cells on which a program operation is not performed. The first memory block may be set as a victim block according to the number of erase pages.

At S1007, when the number of erase pages in the first memory block is stored in the memory controller 200, the memory device 100 may perform a program operation on a selected page of a second memory block. The second memory block may correspond to one of the plurality of memory blocks except for the first memory block. The memory device 100 may perform a program operation so that memory cells coupled to the selected page of the second memory block may reach a target threshold voltage.

At step S1009, when the memory device 100 performs the program operation on the second memory block, the bad block controller 210 may determine whether a program fail occurs in the second memory block. When the program fail is determined to have occurred (that is, "Y" at step S1009), the process flow may proceed to step S1011.

At step S1011, the number of erase pages in the second memory block may be stored in the bad block controller 210. An erase page may include erased memory cells on which a program operation is not performed. The second memory block may be set as a victim block according to the number of erase pages.

At step S1013, the bad block controller 210 may compare the number of erase pages in the first memory block with the number of erase pages in the second memory block. Since more fail pages may be replaced by the erase pages when there are more erase pages, the bad block controller 210 may set a memory block having more erase pages as a victim block.

At step S1015, the memory controller 200 may determine whether the number of erase pages in the first memory block is greater than or equal to the number of erase pages in the second memory block. When it is determined that the number of erase pages in the first memory block is greater than or equal to the number of erase pages in the second memory block (that is, "Y" at step S1015), the process flow may proceed to step S1017. When it is determined that the number of erase pages in the first memory block is less than the number of erase pages in the second memory block (that is, "N" at step S1015), the process flow may proceed to step S1019.

At step S1017, when the number of erase pages in the first memory block is determined to be greater than or equal to the number of erase pages in the second memory block, the bad block controller 210 may set the first memory block as a victim block. The erase page storage 220 may store information about the erase pages in the first memory block.

At step S1019, when the number of erase pages in the first memory block is determined to be less than the number of erase pages included in the second memory block, the bad block controller 210 may set the second memory block as a victim block. The erase page storage 220 may store information about the erase pages included in the second memory block.

Figure 10:
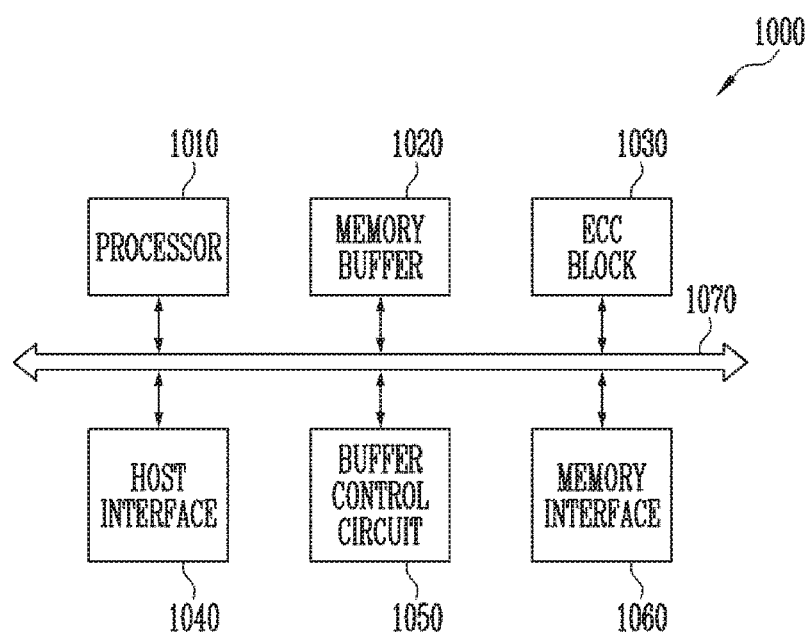
FIG. 10 is a diagram illustrating a memory controller according to an embodiment.

FIG. 10 is a diagram illustrating a memory controller 1000, e.g., the memory controller 200 of FIG. 1, according to an embodiment.

As shown in FIG. 10, the memory controller 1000 may be coupled to the host 300 and the memory device 100. In response to a request from the host 300, the memory controller 1000 may access the memory device 100. For example, the memory controller 1000 may control write, read, erase, and background operations of the memory device 100. The memory controller 1000 may provide an interface between the memory device 100 and the host 300.

The memory controller 1000 may drive firmware for controlling the memory device 100.

Referring to FIG. 10, the memory controller 1000 may include a processor 1010, a memory buffer 1020, an error correction code (ECC) block 1030, a host interface 1040, a buffer control circuit 1050, a memory interface 1060, and a bus 1070.

The bus 1070 may provide a channel between components of the memory controller 1000.

The processor 1010 may control the overall operation of the memory controller 1000 and may perform various logical operations. The processor 1010 may communicate with the host 300 through the host interface 1040 and communicate with the memory device 100 through the memory interface 1060. Further, the processor 1010 may communicate with the memory buffer 1020 through the buffer control circuit 1050. The processor 1010 may control operations of the storage device 50 by using the memory buffer 1020 as a working memory, a cache memory or a buffer memory.

The processor 1010 may perform the function of a flash translation layer (FTL). The processor 1010 may translate the logical address LA, provided by the host 300, into the physical address PA through the flash translation layer FTL. The flash transition layer FTL may receive the logical address LA and translate the logical address LA to the physical address PA by using the mapping information. Any of various address mapping methods may be employed by the flash translation layer FTL, depending on a mapping unit. Examples of such address mapping methods include a page mapping method, a block mapping method, and a hybrid mapping method.

The processor 1010 may randomize data received from the host 300. For example, the processor 1010 may use a randomizing seed to randomize data received from the host 300. The randomized data may be provided, as data to be stored, to the memory device 100 and may be programmed in the memory cell array 110 of the memory device 100.

The processor 1010 may derandomize data received from the memory device 100 during a read operation. For example, the processor 1010 may derandomize the data received from the memory device 100 using a derandomizing seed. The derandomized data may be output to the host 300.

According to an embodiment, the processor 1010 may run software or firmware to perform randomizing and derandomizing operations.

The memory buffer 1020 may serve as an operation memory, a cache memory, or a buffer memory of the processor 1010. The memory buffer 1020 may store codes and commands executed by the processor 1010. The memory buffer 1020 may store data that is processed by the processor 1010. The memory buffer 1020 may include a static random access memory (RAM) (SRAM) or a dynamic RAM (DRAM).

The ECC block 1030 may perform error correction. The ECC block 1030 may perform ECC encoding based on data to be written to the memory device 100 through the memory interface 1060. The ECC-encoded data may be transferred to the memory device 100 through the memory interface 1060. The ECC block 1030 may perform ECC decoding based on data received from the memory device 100 through the memory interface 1060. For example, the ECC block 1030 may be a component in the memory interface 1060.

The host interface 1040 may communicate with the host 300 under the control of the processor 1010. The host interface 1040 may perform communication using at least one of various communication methods such as universal serial bus (USB), serial AT attachment (SATA), serial attached SCSI (SAS), high speed interchip (HSIC), small computer system interface (SCSI), peripheral component interconnection (PCI), PCI express (PCIe), nonvolatile memory express (NVMe), universal flash storage (UFS), secure digital (SD), multimedia card (MMC), embedded MMC (eMMC), dual in-line memory module (DIMM), registered DIMM (RDIMM), and load reduced DIMM (LRDIMM) communication methods.

The buffer control circuit 1050 may control the memory buffer 1020 under the control of the processor 1010.

The memory interface 1060 may communicate with the memory device 100 under the control of the processor 1010. The memory interface 1060 may transmit to, or receive from, the memory device 100 commands, addresses, and data through channels.

For example, the memory controller 1000 may not include the memory buffer 1020 and the buffer control circuit 1050. The memory buffer 1020 and/or the buffer control circuit 1050 may be separate or either or both of their functions distributed within the memory controller 1000.

In an embodiment, the processor 1010 may control the operation of the memory controller 1000 using codes. The processor 1010 may load codes from a nonvolatile memory device (e.g., a read only memory (ROM)) provided in the memory controller 1000. In another example, the processor 1010 may load codes from the memory device 100 through the memory interface 1060.

For example, the bus 1070 of the memory controller 1000 may be divided into a control bus and a data bus. The data bus may transmit data in the memory controller 1000, and the control bus may transmit control information such as commands or addresses in the memory controller 1000. The data bus and the control bus may be isolated from each other, and may neither interfere with nor influence each other. The data bus may be coupled to the ECC block 1030, the host interface 1040, the buffer control circuit 1050, and the memory interface 1060. The control bus may be coupled to the processor 1010, the memory buffer 1020, the host interface 1040, the buffer control circuit 1050, and the memory interface 1060.

Figure 11:
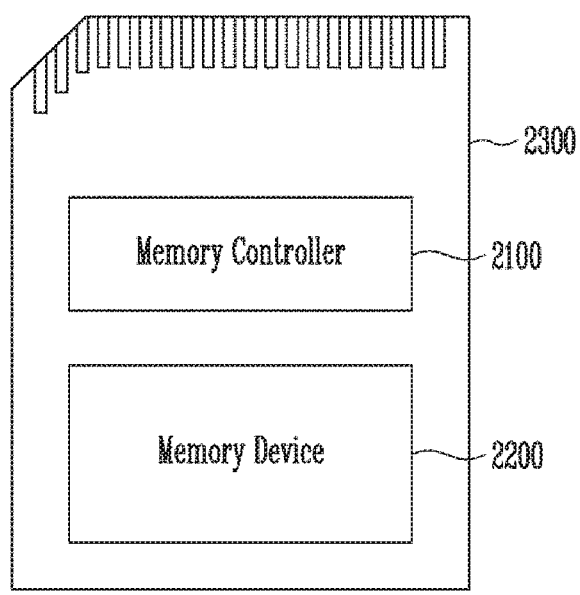
FIG. 11 is a block diagram illustrating a memory card system to which a storage device according to an embodiment is applied.

FIG. 11 is a block diagram illustrating a memory card system 2000 to which a storage device according to an embodiment is applied.

Referring to FIG. 11, the memory card system 2000 may include a memory controller 2100, a memory device 2200, and a connector 2300.

The memory controller 2100 may be coupled to the memory device 2200. The memory controller 2100 may access the memory device 2200. For example, the memory controller 2100 may control read, write, erase, and background operations of the memory device 2200. The memory controller 2100 may provide an interface between the memory device 2200 and a host (e.g., the host 300 of FIG. 1). The memory controller 2100 may drive firmware for controlling the memory device 2200. The memory controller 2200 may be configured in the same manner as the memory controller 200, described above with reference to FIG. 2.

In an embodiment, the memory controller 2100 may include components, such as a random access memory (RAM), a processing unit, a host interface, a memory interface, and an error correction code (ECC) block.

The memory controller 2100 may communicate with an external device (e.g., the host 300 of FIG. 1) through the connector 2300. The memory controller 2100 may communicate with the external device based on a specific communication protocol. In an embodiment, the memory controller 2100 may communicate with the external device through at least one of various communication protocols such as universal serial bus (USB), multimedia card (MMC), embedded MMC (eMMC), peripheral component interconnection (PCI), PCI-express (PCI-e or PCIe), advanced technology attachment (ATA), serial-ATA (SATA), parallel-ATA (PATA), small computer system interface (SCSI), enhanced small disk interface (ESDI), integrated drive electronics (IDE), Firewire, universal flash storage (UFS), Wi-Fi, Bluetooth, and nonvolatile memory express (NVMe) protocols. For example, the connector 2300 may be defined by at least one of the above-described various communication protocols.

In an embodiment, the memory device 2200 may be implemented as any of various nonvolatile memory devices, such as an electrically erasable and programmable ROM (EEPROM), a NAND flash memory, a NOR flash memory, a phase-change RAM (PRAM), a resistive RAM (ReRAM), a ferroelectric RAM (FRAM), and a spin-torque magnetic RAM (STT-MRAM).

The memory controller 2100 and the memory device 2200 may be integrated into a single semiconductor device to form a memory card, such as a personal computer memory card international association (PCMCIA), a compact flash card (CF), a smart media card (e.g., SM or SMC), a memory stick multimedia card (e.g., MMC, RS-MMC, or MMCmicro), a SD card (e.g., SD, miniSD, microSD, or SDHC), a universal flash storage (UFS), and/or the like.

Figure 12:
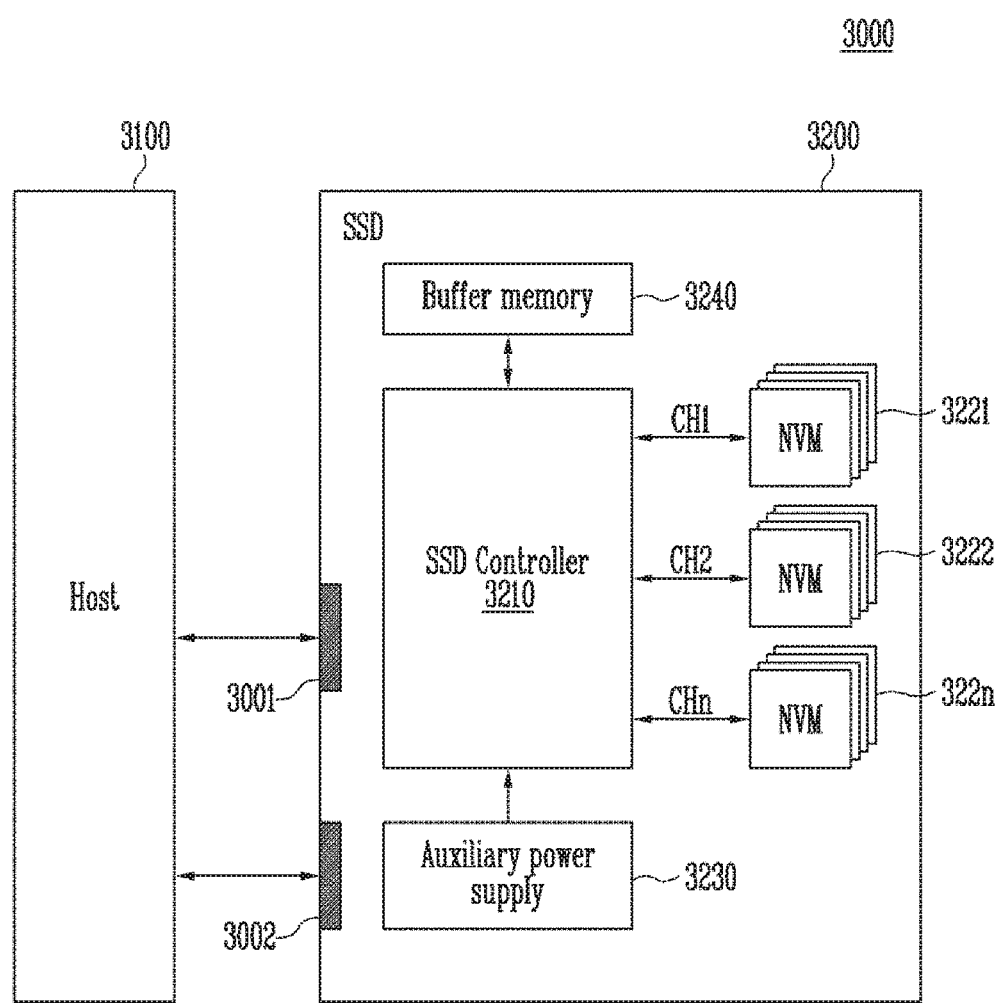
FIG. 12 is a block diagram illustrating an example of a solid state drive (SSD) system to which a storage device according to an embodiment is applied.

FIG. 12 is a block diagram illustrating an example of a solid state drive (SSD) system 3000 to which a storage device, e.g., the storage device 50 of FIG. 1, is applied according to an embodiment.

Referring FIG. 12, the SSD system 3000 may include a host 3100 and an SSD 3200. The SSD 3200 may exchange signals SIG with the host 3100 through a signal connector 3001 and may receive power PWR through a power connector 3002. The SSD 3200 may include an SSD controller 3210, a plurality of flash memories 3221 to 322n, an auxiliary power supply 3230, and a buffer memory 3240.

In an embodiment, the SSD controller 3210 may perform the function of the memory controller 200 described above with reference to FIG. 1.

The SSD controller 3210 may control the plurality of flash memories 3221 to 322n in response to the signals SIG received from the host 3100. In an embodiment, the signals SIG may be based on the interfaces of the host 3100 and the SSD 3200. For example, the signals SIG may be defined by at least one of various interfaces such as universal serial bus (USB), multimedia card (MMC), embedded MMC (eMMC), peripheral component interconnection (PCI), PCI-express (PCI-e or PCIe), advanced technology attachment (ATA), serial-ATA (SATA), parallel-ATA (PATA), small computer system interface (SCSI), enhanced small disk interface (ESDI), integrated drive electronics (IDE), Firewire, universal flash storage (UFS), WiFi, Bluetooth, and nonvolatile memory express (NVMe) interfaces.

The auxiliary power supply 3230 may be coupled to the host 3100 through the power connector 3002. The auxiliary power supply 3230 may be supplied and charged with power PWR from the host 3100. The auxiliary power supply 3230 may supply the power of the SSD 3200 when power is not smoothly supplied from the host 3100. In an embodiment, the auxiliary power supply 3230 may be disposed within or external to the SSD 3200. For example, the auxiliary power supply 3230 may be disposed in a main board and may supply auxiliary power to the SSD 3200.

The buffer memory 3240 may function as a buffer memory of the SSD 3200. For example, the buffer memory 3240 may temporarily store data received from the host 3100 or data received from the plurality of flash memories 3221 to 322n or may temporarily store metadata (e.g., mapping tables) of the flash memories 3221 to 322n. The buffer memory 3240 may include volatile memories such as a dynamic random access memory (DRAM), a synchronous DRAM (SDRAM), a double data rate (DDR) SDRAM, a low power DDR (LPDDR) SDRAM, and a graphic RAM (GRAM) or nonvolatile memories such as a ferroelectric RAM (FRAM), a resistive RAM (ReRAM), a spin-torque magnetic RAM (STT-MRAM), and a phase-change RAM (PRAM).

Figure 13:
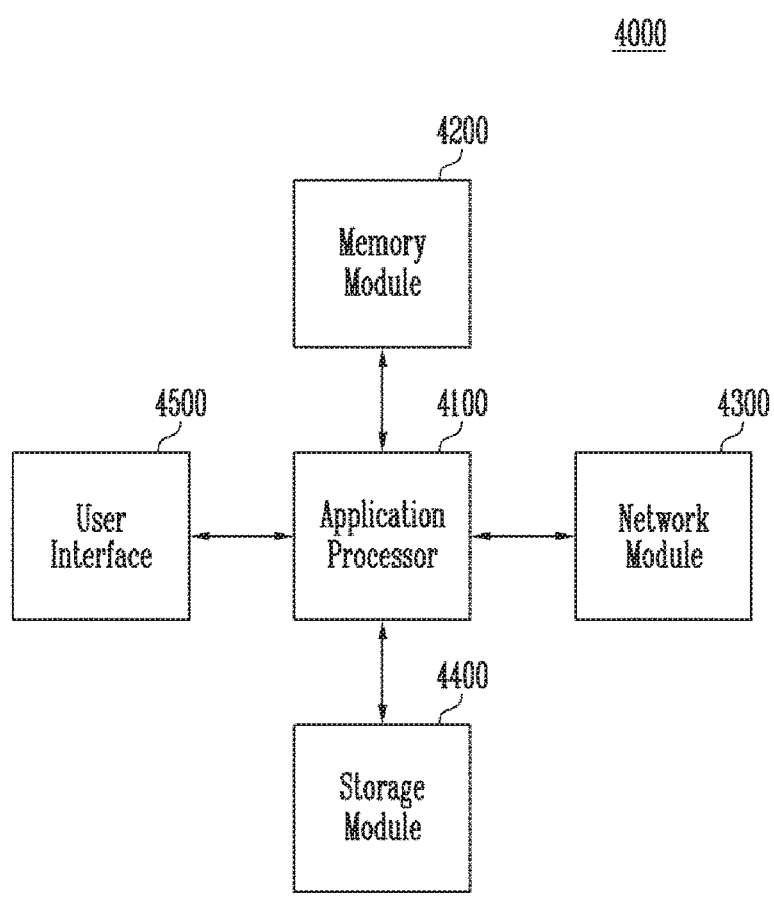
FIG. 13 is a block diagram illustrating a user system to which a storage device according to an embodiment is applied.

FIG. 13 is a block diagram illustrating a user system 4000 to which a storage device, e.g., the storage device 50 of FIG. 1, is applied according to an embodiment.

Referring to FIG. 13, the user system 4000 may include an application processor 4100, a memory module 4200, a network module 4300, a storage module 4400, and a user interface 4500.

The application processor 4100 may run components included in the user system 4000, an operating system (OS) or a user program. In an embodiment, the application processor 4100 may include controllers, interfaces, graphic engines, etc. for controlling the components included in the user system 4000. The application processor 4100 may be provided as a system-on-chip (SoC).

The memory module 4200 may function as a main memory, a working memory, a buffer memory or a cache memory of the user system 4000. The memory module 4200 may include volatile RAMs such as a dynamic random access memory (DRAM), a synchronous DRAM (SDRAM), a double data rate (DDR) SDRAM, a DDR2 SDRAM, a DDR3 SDRAM, a low power DDR (LPDDR) SDARM, an LPDDR2 SDRAM, and an LPDDR3 SDRAM or nonvolatile RAMs such as a phase-change random access memory (PRAM), a resistive RAM (ReRAM), a magnetoresistive RAM (MRAM), and a ferroelectric RAM (FRAM). For example, the application processor 4100 and the memory module 4200 may be packaged based on package-on-package (PoP) and may then be provided as a single semiconductor package.

The network module 4300 may communicate with external devices. For example, the network module 4300 may support wireless communication, such as code division multiple access (CDMA), global system for mobile communication (GSM), wideband CDMA (WCDMA), CDMA-2000, time division multiple access (TDMA), long term evolution (LTE), Wimax, WLAN, UWB, Bluetooth, or Wi-Fi communication. For example, the network module 4300 may be included in the application processor 4100.

The storage module 4400 may store data. For example, the storage module 4400 may store data received from the application processor 4100. Alternatively, the storage module 4400 may transmit the data stored in the storage module 4400 to the application processor 4100. According to an embodiment, the storage module 4400 may be implemented as a nonvolatile semiconductor memory device, such as a phase-change RAM (PRAM), a magnetic RAM (MRAM), a resistive RAM (RRAM), a NAND flash memory, a NOR flash memory, or a NAND flash memory having a three-dimensional (3D) structure. For example, the storage module 4400 may be provided as a removable storage medium (i.e., removable drive), such as a memory card or an external drive of the user system 4000.

For example, the storage module 4400 may include a plurality of non-volatile memory devices, and the plurality of non-volatile memory devices may operate in the same manner as the memory device described above with reference to FIGS. 1 to 3. The storage module 4400 may be operated in the same manner as the storage device 50 described above with reference to FIG. 1.

The user interface 4500 may include interfaces which input data or instructions to the application processor 4100 or output data to an external device. In an embodiment, the user interface 4500 may include user input interfaces such as a keyboard, a keypad, a button, a touch panel, a touch screen, a touch pad, a touch ball, a camera, a microphone, a gyroscope sensor, a vibration sensor, and a piezoelectric device. The user interface 4500 may further include user output interfaces such as a liquid crystal display (LCD), an organic light emitting diode (OLED) display device, an active matrix OLED (AMOLED) display device, an LED, a speaker, and a monitor.

According to embodiments of the present disclosure, a storage device having improved memory block use efficiency and a method of operating the storage device is provided.

In the above-discussed embodiments, all steps may be selectively performed or skipped. In addition, the steps in each embodiment may not always be performed in regular order. Furthermore, the embodiments disclosed herein aims to help those with ordinary knowledge in this art more clearly understand the present disclosure rather than to limit the bounds of the present disclosure. In other words, one of ordinary skill in the art to which the present disclosure belongs will be able to easily understand that various modifications are possible based on the technical scope of the present disclosure.

Embodiments of the present disclosure have been described with reference to the accompanying drawings, and specific terms or words used in the description should be construed in accordance with the spirit of the present disclosure without limiting the subject matter thereof. It should be understood that many variations and modifications of the basic inventive concept described herein still fall within the spirit and scope of the present disclosure as defined in the accompanying claims and equivalents thereof.

It will be apparent to those skilled in the art that various modifications can be made to the above-described embodiments of the present invention without departing from the spirit or scope of the invention. Thus, it is intended that the present invention cover all such modifications provided they come within the scope of the appended claims and their equivalents.

What is claimed is:

1. A storage device, comprising:
a plurality of memory blocks each including a plurality of pages storing data;
an erase page storage configured to store erase page information about erase pages in a victim block among the plurality of memory blocks; and
a bad block controller configured to replace a fail page in which a program fail occurred with one of the erase pages, based on the erase page information, the fail page being one of the plurality of pages in one of the plurality of memory blocks other than the victim block,
wherein the victim block is a bad block including a first fail page in which a program fail has occurred firstly among the plurality of memory blocks, and
wherein the erase pages are subsequent pages of the first fail page in a program direction.

2. The storage device of claim 1, wherein the erase pages include remaining pages other than a page on which a program operation is performed.

3. The storage device of claim 2, wherein the erase pages include remaining pages, other than pages adjacent to a fail page in which a program fail has occurred, among pages in the victim block.

4. The storage device of claim 1, wherein the erase pages are included in the victim block and correspond to pages in an erase state after garbage collection is performed on the victim block.

5. The storage device of claim 1, wherein the erase page information includes information about physical addresses of the erase pages.

6. The storage device of claim 1, wherein the erase page storage stores the erase page information in a circular queue.

7. The storage device of claim 1, wherein the bad block controller comprises:
an operation controller configured to determine the victim block among the plurality of memory blocks; and
a page information setter configured to receive fail page information about a fail page in which a program fail has occurred, among pages in the victim block, from the operation controller and provide the erase page information provided from the erase page storage to the operation controller.

8. The storage device of claim 7, wherein the operation controller stores data to be stored in the fail page, among the pages included in the one of the memory blocks except for the victim block, in one of the erase pages.

9. The storage device of claim 7, wherein the page information setter generates mapping information indicating that a physical address of the fail page, among the pages included in the one of the memory blocks except for the victim block, is changed to a physical address of one of the erase pages.

10. A method of operating a storage device, comprising:
performing a program operation on a plurality of pages included in a plurality of memory blocks;
determining a bad block including a first fail page in which a program fail has occurred firstly, among the plurality of memory blocks, as a victim block;
storing erase page information about erase pages in the victim block; and
replacing a fail page in which a program fail occurs, among pages in one of the plurality of memory blocks other than the victim block, with one of the erase pages, based on the erase page information,
wherein the erase pages are subsequent pages of the first fail page in a program direction.

11. The method of claim 10, wherein the erase pages include remaining pages other than a page on which the program operation is performed.

12. The method of claim 10, wherein the storing of the erase page information comprises storing information about physical addresses of the erase pages.

13. The method of claim 10, wherein the storing of the erase page information comprises storing information about the erase pages in a circular queue.

14. The method of claim 10, further comprising generating mapping information indicating that a physical address of the fail page, among the pages included in the one of the memory blocks except for the victim block, is changed to a physical address of one of the erase pages.

15. The method of claim 10, further comprising storing data to be stored in the fail page, among the pages included in the one of the memory blocks except for the victim block, in one of the erase pages.

16. The method of claim 10, wherein the determining of the bad block as the victim block comprises determining a bad block in which a first program fail occurs, among the plurality of memory blocks, as the victim block.

17. The method of claim 10, wherein the determining of the bad block as the victim block includes determining one of bad blocks in which at least two program fails occur, among the plurality of memory blocks, as the victim block according to a number of erase pages in each of the bad blocks.

* * * * *